United States Patent
Dance et al.

(10) Patent No.: US 11,370,116 B2
(45) Date of Patent: *Jun. 28, 2022

(54) APPARATUS FOR COOPERATIVELY TRANSPORTING A LOAD

(71) Applicant: M-MOVER HOLDINGS LIMITED, Ashbourne (GB)

(72) Inventors: Sam Dance, Ashbourne (GB); Daniel Evans, Ashbourne (GB); Andrew Owen, Ashbourne (GB)

(73) Assignee: M-MOVER HOLDINGS LIMITED, Ashbourne (GB)

( * ) Notice: Subject to any disclaimer, the term of this patent is extended or adjusted under 35 U.S.C. 154(b) by 151 days.

This patent is subject to a terminal disclaimer.

(21) Appl. No.: 16/329,333

(22) PCT Filed: Sep. 1, 2017

(86) PCT No.: PCT/GB2017/052554
§ 371 (c)(1),
(2) Date: Feb. 28, 2019

(87) PCT Pub. No.: WO2018/042192
PCT Pub. Date: Mar. 8, 2018

(65) Prior Publication Data
US 2019/0248010 A1    Aug. 15, 2019

(30) Foreign Application Priority Data
Sep. 1, 2016 (GB) ..................... 1614853

(51) Int. Cl.
*B25J 9/16* (2006.01)
*B60P 3/40* (2006.01)
(Continued)

(52) U.S. Cl.
CPC ............. *B25J 9/1669* (2013.01); *B25J 5/007* (2013.01); *B60K 7/0007* (2013.01); *B60L 3/04* (2013.01);
(Continued)

(58) Field of Classification Search
CPC ...... B62D 7/026; B62D 12/02; B62D 7/1509; B62D 6/001; B62D 7/144; B62D 11/003;
(Continued)

(56) References Cited

U.S. PATENT DOCUMENTS

| 4,840,533 A | * | 6/1989 | Althoff | ..................... | B66F 7/18 |
| | | | | | 414/495 |
| 2003/0030399 A1 | * | 2/2003 | Jacobs | ................. | G05D 1/0274 |
| | | | | | 318/568.16 |

(Continued)

FOREIGN PATENT DOCUMENTS

| FR | 3012122 A1 | 4/2015 |
| GB | 2029874 A | 3/1980 |
| JP | 2011020592 A | 2/2011 |

OTHER PUBLICATIONS

International Search Report and Written Opinion, PCT/GB2017/052554, dated Nov. 27, 2017.
(Continued)

*Primary Examiner* — Marthe Y Marc-Coleman
(74) *Attorney, Agent, or Firm* — Miller Nash LLP

(57) ABSTRACT

An apparatus for transporting a load is described, including: a body including a part or portion for engaging with or connecting to a load to be transported; a ground-engaging device supporting the body, the ground-engaging device for effecting movement of the body over a surface; a transmitter module; a receiver module; and a controller for communicating with the transmitter and receiver modules and the ground engaging device and for receiving status signals
(Continued)

from components and/or devices of the apparatus, wherein the controller is capable of conducting a check as to the status of the components and/or devices of the apparatus, and after completing said check to provide an "apparatus operative" or "apparatus non-operative" signal to the transmitter module, wherein the transmitter module is configured to transmit the "apparatus operative" or "apparatus non-operative" signal, and wherein the receiver module is configured to receive from a first predetermined, or designated, other such apparatus its respective "apparatus operative" or "apparatus non-operative" signals.

28 Claims, 6 Drawing Sheets

(51) Int. Cl.
| | | |
|---|---|---|
| B62D 7/02 | (2006.01) | |
| B62D 12/02 | (2006.01) | |
| B62D 7/15 | (2006.01) | |
| B25J 5/00 | (2006.01) | |
| B60K 7/00 | (2006.01) | |
| B60L 3/04 | (2006.01) | |
| B60L 3/12 | (2006.01) | |
| B62D 6/00 | (2006.01) | |
| G05D 1/02 | (2020.01) | |
| B62D 7/14 | (2006.01) | |

(52) U.S. Cl.
CPC ...... *B60L 3/12* (2013.01); *B60P 3/40* (2013.01); *B62D 6/001* (2013.01); *B62D 7/026* (2013.01); *B62D 7/1509* (2013.01); *B62D 12/02* (2013.01); *G05D 1/0276* (2013.01); *G05D 1/0291* (2013.01); *B60K 2007/0038* (2013.01); *B60L 2200/36* (2013.01); *B62D 7/144* (2013.01); *G05B 2219/39147* (2013.01)

(58) Field of Classification Search
CPC ........ B62D 11/04; B51J 5/007; B60K 7/0007; B60K 2007/0038; B60L 3/04; B60L 3/12; B60L 2200/0036; G05D 1/0276; B60P 3/40; G05B 2219/39147; E01B 29/05; G08C 17/02

See application file for complete search history.

(56) References Cited

U.S. PATENT DOCUMENTS

| | | | |
|---|---|---|---|
| 2005/0045429 | A1 | 3/2005 | Baker |
| 2008/0071429 | A1* | 3/2008 | Kraimer ............. B66F 9/07581 701/2 |
| 2008/0164078 | A1* | 7/2008 | Rhodes ................. B62D 12/02 180/6.48 |
| 2013/0240300 | A1 | 9/2013 | Fagan et al. |
| 2015/0125252 | A1 | 5/2015 | Berzen Ratzel |
| 2015/0232309 | A1 | 8/2015 | Jaipaul et al. |
| 2016/0200236 | A1* | 7/2016 | Buckingham ......... B60W 10/20 701/41 |
| 2017/0269597 | A1* | 9/2017 | Maekawa ............ G05D 1/0289 |
| 2017/0364073 | A1* | 12/2017 | Guy ........................ B25J 5/005 |

OTHER PUBLICATIONS

Search and Examination Report, GB1614853.8, dated Feb. 1, 2017.
Natsuki Miyata et al., "Cooperative Transport by Multiple Mobile Robots in Unknown Static Environments Associated with Real-Time Task Assignment," IEEE Transactions on Robotics and Automation, 18(5) Oct. 1, 2002.

* cited by examiner

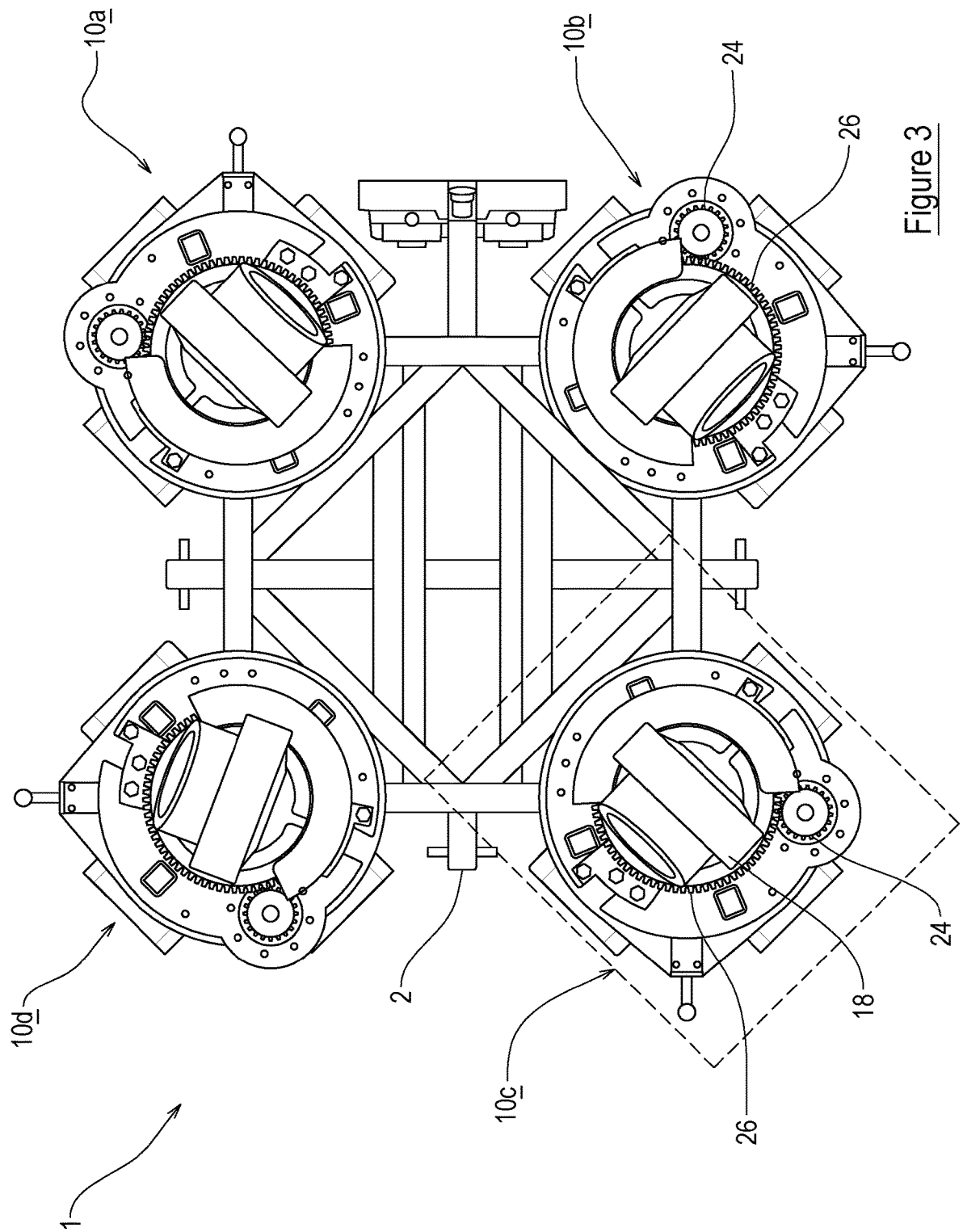

MODE 3:
Rotation around central point of load
No linear travel allowed

MODE 4:
Wheel Locked in same direction
Linear travel allowed
No rotation

MODE 1:
Load follows a radius controlled by the user.
Speed also controlled by user.

MODE 1:
Load follows a radius controlled by the user.
Speed also controlled by user.

APPARATUS FOR COOPERATIVELY TRANSPORTING A LOAD

CROSS-REFERENCE TO RELATED APPLICATIONS

This application is a 371 of International Application No. PCT/GB2017/052554, filed Sep. 1, 2017, which claims priority to GB Patent Application 1614853.8, filed Sep. 1, 2016, the contents of both of which are incorporated by reference herein in their entirety.

TECHNICAL FIELD

This invention relates to an apparatus for transporting a load, to a system for transporting a load and to a method of operating such a system.

BACKGROUND

More particularly, this invention relates to an apparatus for transporting a load by pushing or pulling the load over a ground surface. Such apparatus typically include a ground engaging wheel or wheels which are driven by a motor to effect said movement. The apparatus is connectable to or engageable with the load so as to move it. In some prior art systems, heavy loads are moved with the aid of two or more such apparatus, with the apparatus being connected to the load or being connected to or forming part of a structure (e.g. a frame or the like) on which the load is supported. In such multiple-apparatus systems, it is necessary to have a coordinated action of the apparatus to move the load.

SUMMARY

According to a first aspect of the invention, we provide an apparatus for transporting a load, including:
a body including a part or portion for engaging with or connecting to a load to be transported;
a ground-engaging device supporting the body, the ground-engaging device for effecting movement of the body over a surface;
a transmitter module;
a receiver module; and
a controller for communicating with the transmitter and receiver modules and the ground engaging device and for receiving status signals from components and/or devices of the apparatus,
wherein the controller is capable of conducting a check as to the status of the components and/or devices of the apparatus, and after completing said check to provide an "apparatus operative" or "apparatus non-operative" signal to the transmitter module,
wherein the transmitter module is configured to transmit the "apparatus operative" or "apparatus non-operative" signal, and
wherein the receiver module is configured to receive from a first predetermined, or designated, other such apparatus its respective "apparatus operative" or "apparatus non-operative" signals.

According to a second aspect of the invention, we provide a system for transporting a load including at least three apparatus (A, . . . , n-1, n) each in accordance with the first aspect of the invention, and a central command module for sending movement instructions to move or stop movement of the ground-engaging device of each apparatus, wherein the receiver module of each apparatus is configured to receive from a first predetermined, or designated, other such apparatus its respective "apparatus operative" or "apparatus non-operative" signals.

According to a third aspect of the invention, we provide a method of operating the system according to the second aspect of the invention, the method including the steps of:
for each apparatus, conducting a check as to the status of the components and/or devices of the apparatus, and after completing said check providing an "apparatus operative" or "apparatus non-operative" signal to its transmitter module,
for each apparatus, transmitting its "apparatus operative" or "apparatus non-operative" signal,
for each apparatus, receiving "apparatus operative" or "apparatus non-operative" signals from a predetermined, or designated, one of the other apparatus,
wherein, if one or more of the apparatus of said system are in an "apparatus non-operative" state, the controller of each apparatus either shuts down its respective apparatus or ceases to act on any movement instructions received from the central command module.

Further features of the various aspects of the invention are set out in the claims appended hereto.

BRIEF DESCRIPTION OF THE DRAWINGS

Embodiments of the invention will be described, by way of example only, in accordance with the attached figures, of which:

FIG. 3 is an underside view of the system shown in FIG. 1;

DETAILED DESCRIPTION OF THE EMBODIMENTS

Figure 1:
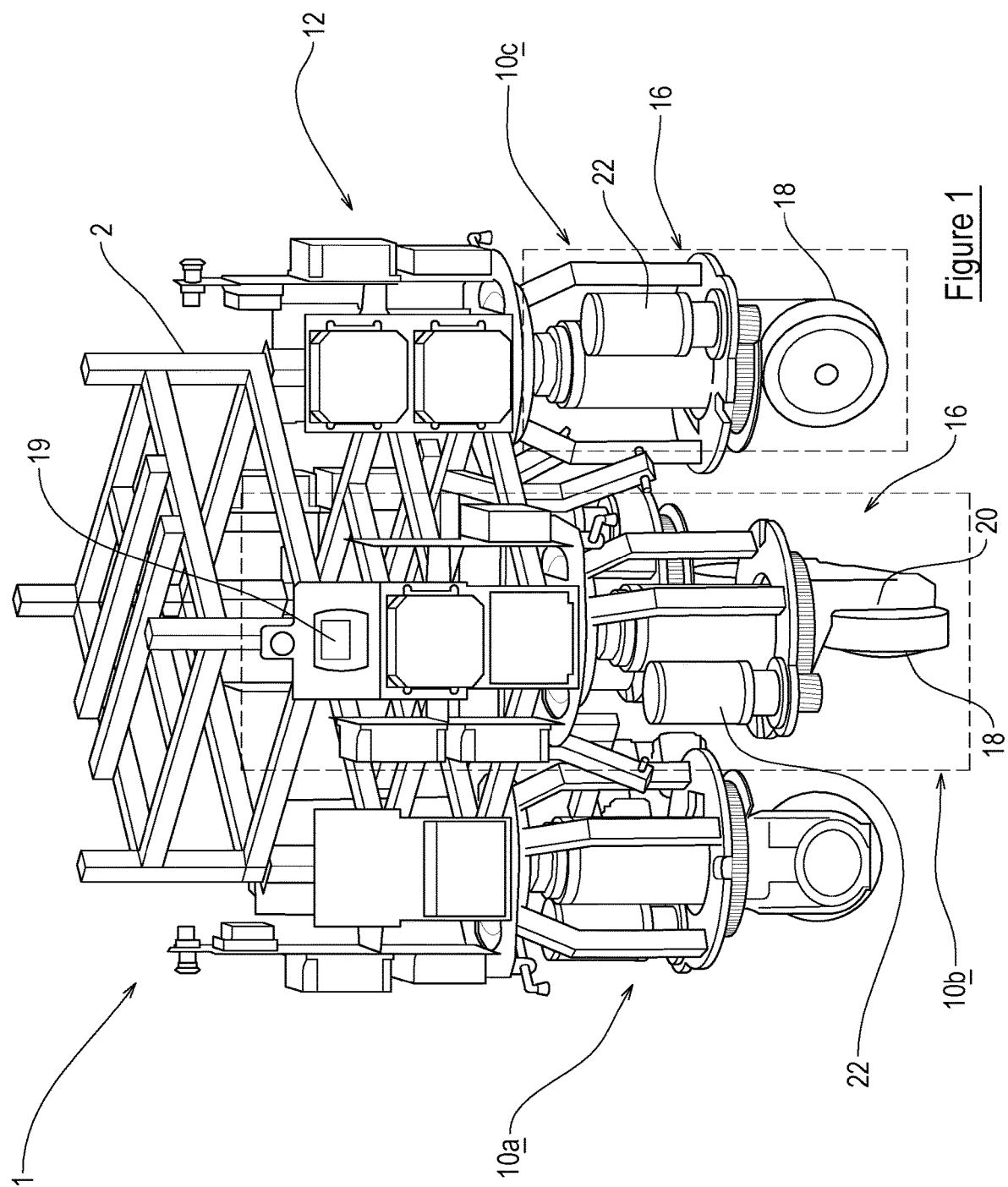
FIG. 1 is a perspective view of a system in accordance with the second aspect of the invention.
Figure 2:
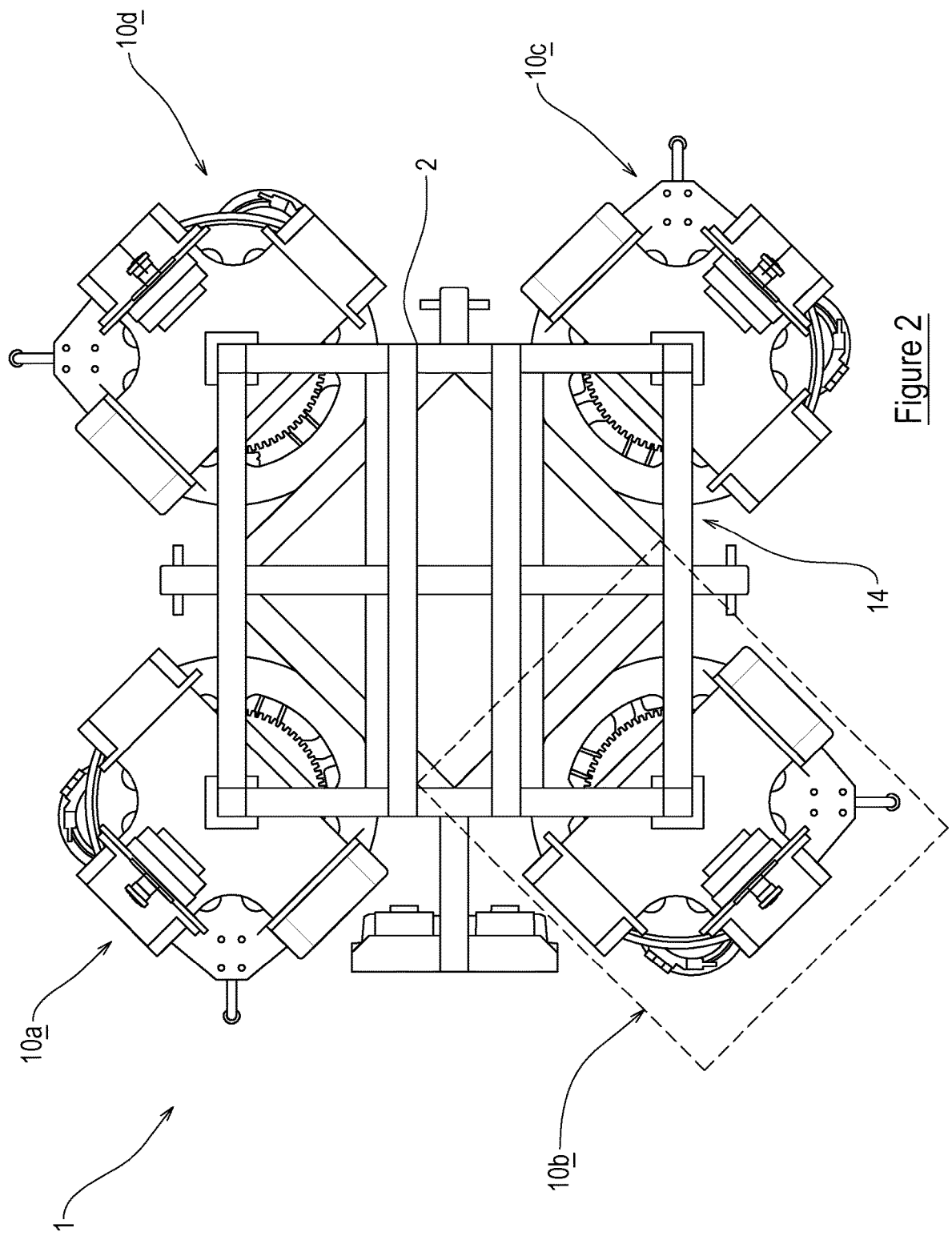
FIG. 2 is a plan view of the system shown in FIG. 1.
Figure 4C:
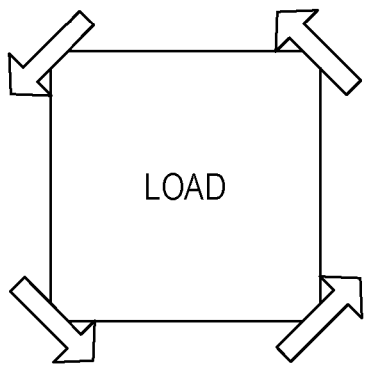
FIGS. 4a to 4d are a schematic diagram showing four possible modes of operation of the system shown in FIG. 1.
Figure 4D:
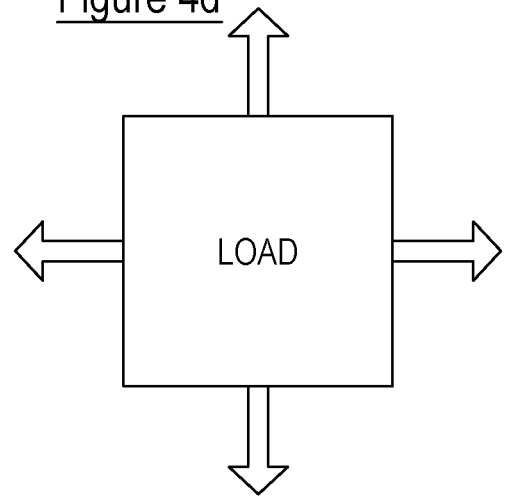
Figure 4A:
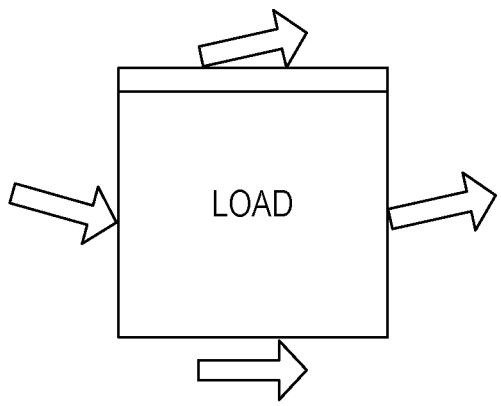
Figure 4B:
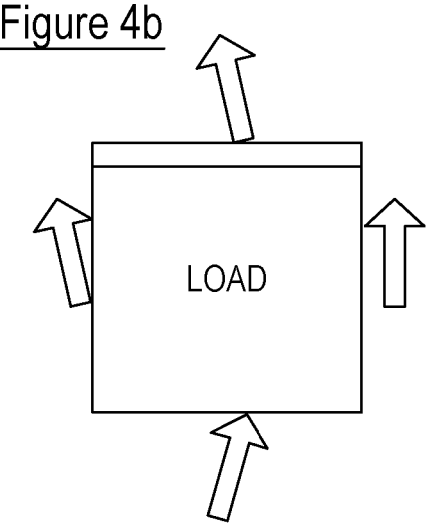

Referring to FIGS. 1 to 3, these show a system 1 for transporting a load, including a plurality of apparatus 10 (10a, 10, 10c, 10d, but hereinafter referred to as 10 for ease of reference). In this example the system 1 includes four apparatus 10, but it should be appreciated that more or fewer apparatus 10 could be used. For instance, two, three or more apparatuses 10 may be needed to transport a load, or it may be that twelve apparatuses 10 are needed to transport a load, depending on the load's weight and dimensions. The number of apparatuses used depends on the weight and size of the load to be transported.

The apparatuses 10 are connected to each other by a frame 2 which in this example is used to support the load to be transported. The frame 2 may be larger or smaller than that which is depicted in the figures. The size of frame used may depend on the size and/or the weight of the load that needs to be transported. Thus, in some embodiments, the frame may be significantly larger, with the apparatus 10 spaced much further apart from each other. In some embodiments, the apparatus 10 may not be positioned at the corners of the frame, but may instead be positioned at some position along the frame between adjacent corners. The frame need not necessarily be rectangular. It could be triangular or another shape.

In alternative embodiments, the system may not include a frame. In such embodiments, the apparatus 10 may each engage with or connect to a portion of the load to be transported. Each apparatus 10 may also be equipped with an identification device, such as for example an RFID device. In such an embodiment, the load to be transported may include corresponding identification devices at the location with which the apparatus 10 engage with or connect to the load. The RFID devices therefore enable the system to know the location of each apparatus 10 so that movement of the apparatus 10 can be coordinated accurately to move the load as desired.

The apparatus 10 includes a body 12 which includes a part or portion 14 for engaging with or connecting to a load to be transported. In the present embodiment, the part or portion 14 is a part of the frame 2 which connects the four apparatuses together. In alternative embodiments, where the frame is not required, each apparatus 10 may be provided with a connection formation to connect to the load. This may be by way of a quick release connection or may be semi-permanent, e.g. by way of fasteners. Each apparatus 10 may alternatively have a support formation upon which a portion of the load is located (or which is positioned under a portion of the load), and in such embodiments, it may be necessary for the support formation to be moveable upwardly (manually or automatically) so as to transmit a portion of the weight of the load to the wheel(s) of the apparatus, as is well known in the art.

Each apparatus 10 includes a ground-engaging device 16 supporting the body 12, the ground-engaging device 16 for effecting movement of the body 12 over a surface. In the present embodiment the ground-engaging device 16 includes a wheel 18 rotatable about a substantially horizontal axis which is driven by an electric motor 20. A further electric motor 22 is provided for effecting steering of the wheel 18. In this embodiment, the further electric motor 22 is mounted to provide rotation of the support for the wheel 18 about a substantially vertical axis. The further electric motor 22 is provided with an output shaft on which is supported a gear 24 which meshes with a further gear 26 connected to the support for the wheel 18. The gears 24, 26 are both mounted in a substantially horizontal plane and effect rotation of the wheel 18 about a substantially vertical axis. However, bevel, or crown, gears may instead be used to permit the further electric motor 22 to be mounted in a different position.

Referring to FIG. 4, the apparatus 10 are operated synchronously to move the load as desired. In order to achieve this, coordinated steering and drive to the wheels 18 of each apparatus 10 is necessary. The four wheels 18 of the system 1 may move in different modes.

Figure 5:
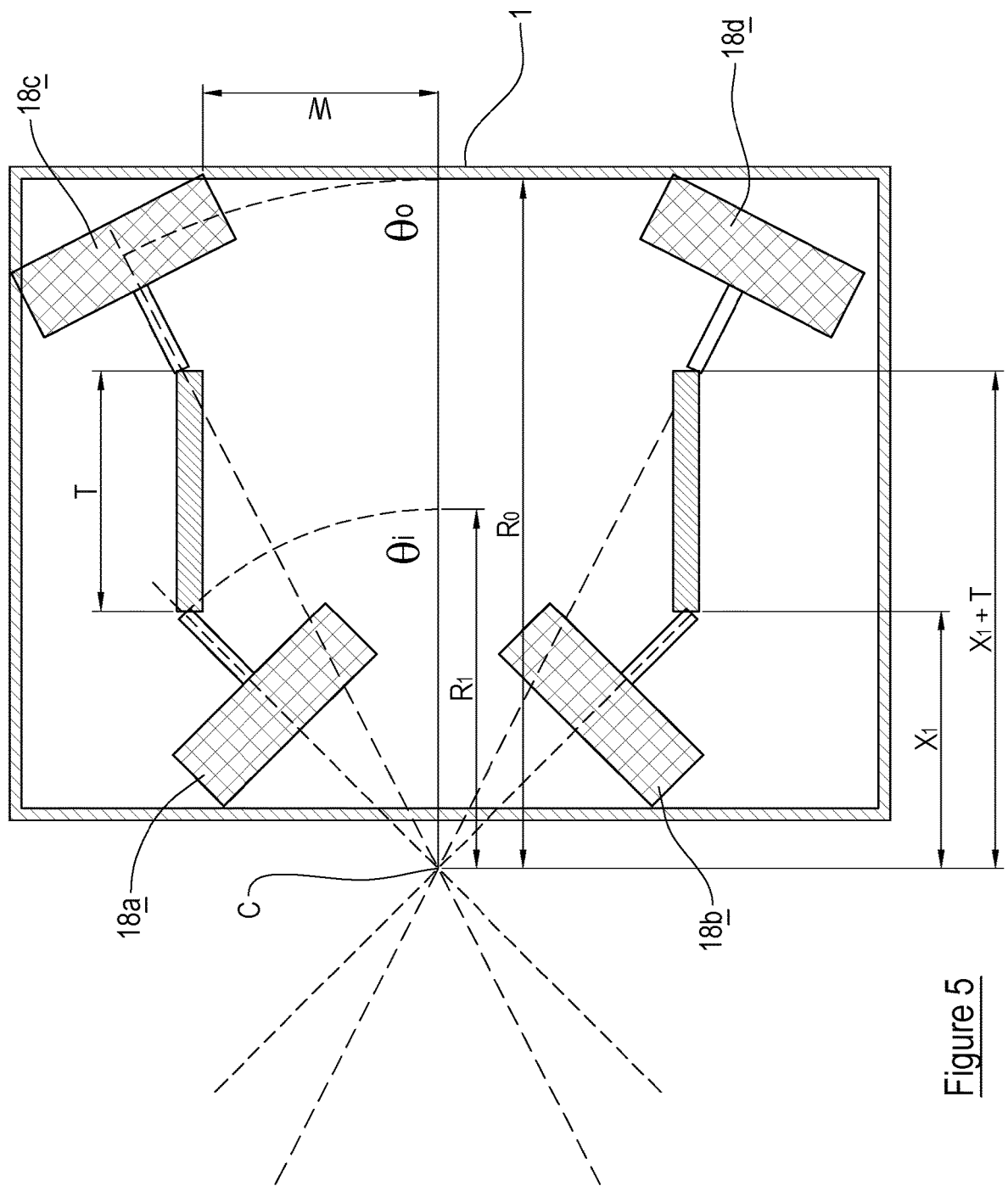
FIG. 5 is a schematic view of the system of FIG. 1 steering in Mode 1.

In Mode 1 (see FIGS. 4a and 4b) the system 1 acts like a four-wheel-steered car. Thus, all four wheels 18 are steered to desired positions and driven so as to effect left or right hand steered movement. As will be appreciated, the innermost wheels 18a, 18b (e.g. those on the left of the system when turning left) are steered to a greater angle than the wheels 18c, 18d on the outside. This is shown by way of example in FIG. 5, where C indicates the axis of the turn.

Mode 3 (see FIG. 4c) permits the load to be rotated. A point between all of the apparatuses 10, e.g. a substantially central axis of the load, is selected around which all of the apparatuses 10 rotate. In order to achieve this, the direction of each of the wheels 18 must be steered by the motors 22 so that they each point substantially perpendicularly to a plane which intersects the central axis of the load. All four wheels 18 can then be driven forwardly or rearwardly to effect clockwise or anti-clockwise rotation of the load.

In Mode 4 (see FIG. 4d) the wheels 18 of the apparatuses 10 are all forced, or locked, so as to move in the same direction. This permits linear translational movement of the load only, in any direction.

Whilst in the present embodiment wheels 18 are used, other types of ground engaging device may also be used. For instance, castor wheels may be used in combination with fixed wheels to permit steering of the apparatus whilst providing a simpler setup for the motors driving the apparatus. Alternatively, each apparatus may include one or a set of caterpillar-like tracks to enable the apparatus 10 to negotiate difficult surfaces.

Figure 6:
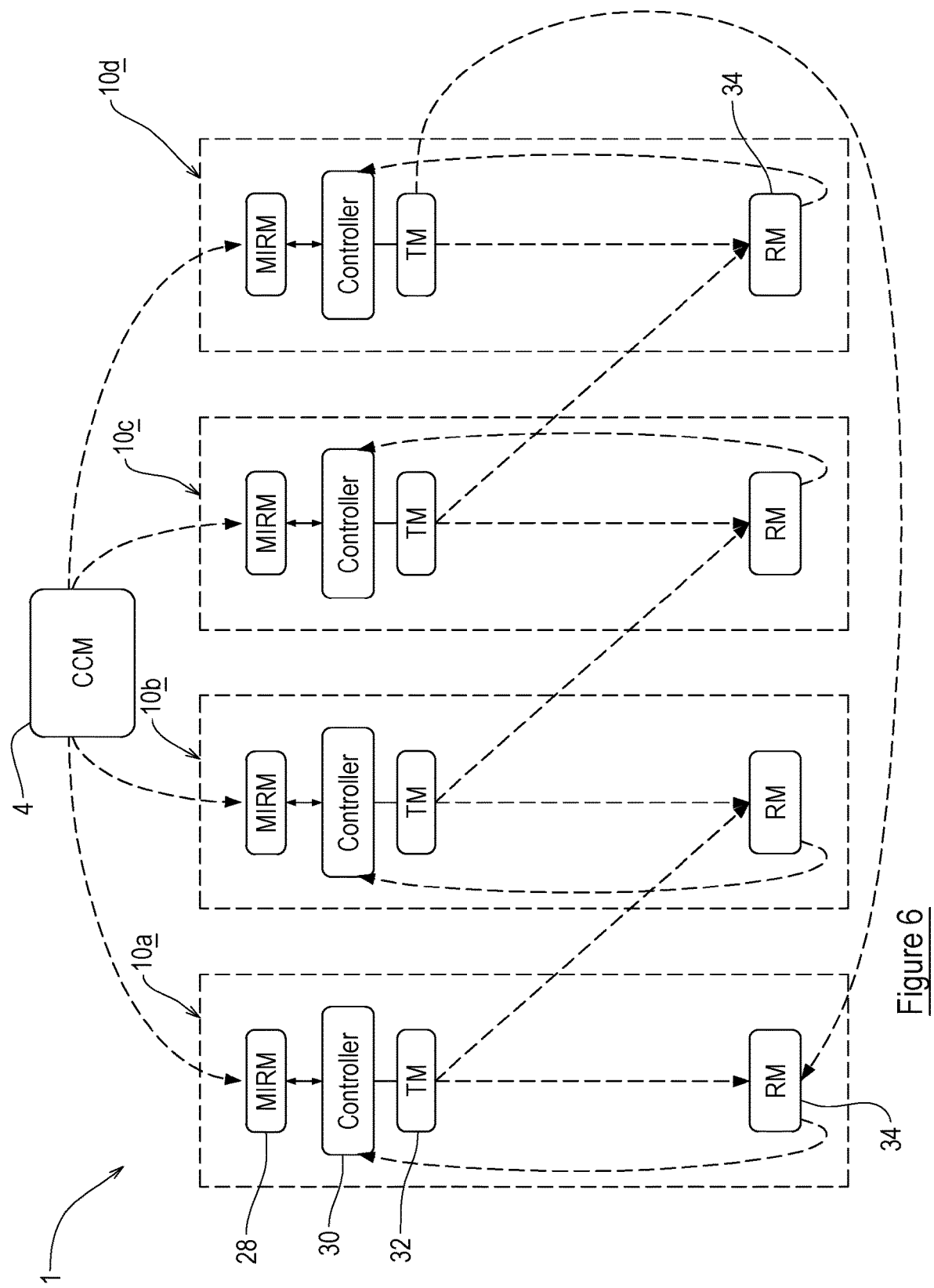
FIG. 6 is a schematic diagram showing communication between the apparatus of the system shown in FIG. 1.

As mentioned above, the apparatuses 10 are used as part of a system 1. The system 1 includes a plurality of apparatuses 10 and a central command module (CCM) 4 (described in more detail below), for sending movement instructions to move or stop movement of the wheels 18 of each apparatus 10. Referring to FIG. 6, which shows a schematic of the system 1, each of the apparatuses 10 is provided with a movement instruction receiver module (MIRM) 28 capable of receiving instructions to move or stop movement of the wheel 18 from the central command module 4. The CCM 4 is a user operated control that is used to transmit instructions to each of the apparatuses 10. The CCM 4 is capable of coordinating the movements of the apparatuses 10 to ensure that the apparatuses 10 work together, and do not work against each other. The movement instructions from the CCM 4 may include one or both of direction or speed instructions for the wheels 18. The movement instructions may differ for each apparatus 10 depending on their position relative to the load to be transported. The CCM 4 may send other instructions to the apparatuses 10.

The apparatus 10 is provided with a controller 30. The controller 30 communicates with a transmitter module (TM) 32 and receiver module (RM) 34 and the ground engaging device 16, and other components/devices of the apparatus 10. In particular the controller 30 is capable of sending and receiving signals to and/or from the TM and/or RM 32, 34. This is advantageous. For instance, communicating with the ground engaging device 16 enables the controller 30 to instruct the ground engaging device 16 to operate, thus moving the apparatus 10. It also enables the controller 30 to control other component parts of the apparatus 10. For example, if the body 12 included a support formation upon which a portion of the load is located, the controller 30 may be able to control the raising/lowering of the support.

The controller 30 also receives status signals from other components and/or devices of the apparatus 10 (e.g. battery condition, battery power, motor(s) conditions/operation). This enables the controller 30 to be capable of conducting a check as to the status of the components and/or devices of the apparatus 10, and after completing said check to provide an "apparatus operative" or "apparatus non-operative" signal to the transmitter module (TM) 32. Receiving status signals from components and/or devices of the apparatus 10 and conducting a check as to the status of the components and/or devices of the apparatus is advantageous. This enables the controller 30 to determine if components and/or devices of the apparatus 10 are functioning correctly and if it is safe for the apparatus 10 to continue to transport the load. It also allows the controller 30 to send status information back to the CCM 4 to alert a user when one of the apparatus 10 has failed or may be about to fail, and what component is going to fail. This saves a user time in troubleshooting what a problem may be with an apparatus 10 and allows the user to make the apparatus functional again more quickly than was previously possible. For example, if a battery powering one of the apparatus 10 is about to run out, the user can either charge the battery before further operation of the system 1, or switch in a spare apparatus so that the system 1 can continue to operate.

Each apparatus 10 may be provided with a display 19 for displaying information about the apparatus 10. For example, the display 19 may show the battery power remaining, or it may indicate when components and/or devices of the apparatus 10 need to be serviced. The display may also show any non-critical errors that have occurred in the apparatus 10.

The TM 32 is configured to transmit, or broadcast, an "apparatus operative" or "apparatus non-operative" signal. The RM 34 is configured to receive from a first predetermined, or designated, other such apparatus 10 in the system 1 its respective "apparatus operative" or "apparatus non-operative" signals. The TM 32 is, in particular, configured to transmit an "apparatus operative" or "apparatus non-operative" signal to a RM 34 of the first, or a second, predetermined, or designated, other such apparatus 10. The TM 32 is also configured to transmit the "apparatus operative" or "apparatus non-operative" signal to its own RM 34. Alternatively, the TM 32 is configured to transmit a signal that the RM 34 of the first, or a second, predetermined, or designated, other such apparatus 10 in the system 1 is configured to receive. The system 1 is configured such that the controller 30 will only cause operation of the ground-engaging device 16 to move the apparatus 10 if its RM 34 has received "apparatus operative" signal from its TM 32 and from the TM 32 of the first or second other such apparatus 10 in the system (in this example, one of the other three apparatuses 10). This is advantageous because it permits fast and efficient shutdown of the system 1 as a whole in the event that one of the apparatus 10 is "non-operative". In such a situation, it might be dangerous to continue transporting the load, so full shutdown of all of all of the apparatus in the system 1 is essential, and within a short time period. The present invention is capable of achieving a full shutdown of the system 1 within 60 ms of a fault being determined with one of the apparatus 10.

In the present embodiment, the controller 30 conducts a check of the status of the components and/or devices of the apparatus 10 periodically, e.g. every 5 to 10 milliseconds. However, the check as to the status of the components and/or devices of each apparatus 10 may, alternatively, be continuous.

In one example the controller 30 requests a status from each of the components/devices of the apparatus 10. The components/devices then return their status to the controller 30, so the controller 30 can then conduct a check of the statuses to determine if an "apparatus operative" or "apparatus non-operative" signal should be sent to the TM 32. In an alternative example, the components and/or devices of the apparatus 10 may automatically send signals, either continuously or periodically, as to their status to the controller 30.

In the present example there are four apparatus 10 in the system 1. However, the system 1 may include a plurality of n apparatus 10, where n can be any number greater than two. The apparatus 10 in such a system 1 may be labelled A, . . . , n−1, n. It should be appreciated that the apparatus 10 in the system 1 may be labelled in any particular order and the labelling of each apparatus 10 should not be taken to be limiting. For example a system is envisaged with apparatus A, . . . , n−1, and n, i.e. at least three apparatus 10. Each receiver module of each apparatus 10 is configured to receive a first predetermined, or designated, other such apparatus 10 its respective "operative" or "non-operative" signals. In an example system comprising n apparatus, for instance: when apparatus A transmits a signal it is only capable of being received by the receiver module of apparatus n−1; when apparatus n−1 transmits a signal it is only capable of being received by the receiver module of apparatus n; and when apparatus n transmits a signal it is only capable of being received by the receiver module of apparatus A. It should be appreciated that this order may be changed without departing from the scope of the present invention.

Additionally, the transmitter module of each apparatus 10 is configured to transmit the "apparatus operative" or "apparatus non-operative" signal to a receiver module of the first or a second other such apparatus 10. In the n apparatus system 1, for instance: apparatus A only transmits a signal to apparatus n−1; apparatus n−1 only transmits a signal to apparatus n; and apparatus n only transmits a signal to apparatus A.

The system 1 is also configured so to transmit their operative status signals sequentially. This may be achieved by each apparatus 10 only being capable of transmitting its operative status once it has received the operative status of its first, or second, predetermined, or designated, other such apparatus 10. In a system comprising n apparatus, the system would operate as follows: apparatus A only transmits its operative status once the receiver module of apparatus A has received the status of apparatus n; apparatus n−1 only transmits its operative status once the receiver module of apparatus n−1 has received the status of apparatus A; apparatus n only transmits its operative status once the receiver module of apparatus n has received the status of apparatus n−1.

The CCM may also receive the operative status of each of the apparatuses 10 in the system 1.

In the present example, the TM 32 transmits an "apparatus operative" or "apparatus non-operative" signal to the RM 34 of the first or second predetermined, or designated, other such apparatus 10 in the system 1 via a hard-wired connection, e.g. via wiring supported on the frame 2. The TM 32 may also transmit the "apparatus operative" or "apparatus non-operative" signal to its own RM 34 via a hard-wired connection. However, in alternative embodiments the TM 32 may transmit an "apparatus operative" or "apparatus non-operative" signal to the RM 34 of the first or second predetermined, or designated, other such apparatus 10 in the system 1 via a wireless connection. Likewise, the TM 32 may transmit an "apparatus operative" or "apparatus non-operative" signal to its own RM 34 via a wireless connection. Providing a wireless connection is advantageous, because it permits the apparatuses 10 to be separate and move freely from each other. It also allows an apparatus 10 to be replaced with ease, in the event that one fails. Wireless transmission also means that the component/devices of the apparatus 10 can be built into a more compact space, as there is no longer a need to locate components/devices in certain positions to enable them to communicate with each other and/or with the controller 30.

It will be appreciated that a significant advantage of the present invention is that each of the apparatus 10 of the system 1 is identical/virtually identical in shape and operation, which means that they can be interchanged with ease. Also, in the event that one fails, a spare such apparatus 10 can be used in any location within the system 1. All that is necessary is for the system 1 to know the location of each apparatus 10 and this can easily be done with reference to the identification device, such as for example an RFID device, provided on the apparatus 10 and on the load to be transported (or on the frame 2 supporting it). Thus, unlike prior art systems, the system of the present invention does not rely on there being a master apparatus with a plurality of slave apparatus. In such systems there is a need for the user to have spare master and slave apparatus, which increases costs significantly.

The method of operating the system 1 is as follows. The method includes the step of (for each apparatus 10) conducting a check as to the status of the components and/or devices of the apparatus 10, and after completing said check providing an "apparatus operative" or "apparatus non-operative" signal to its TM 32. Each apparatus 10 then transmits its "apparatus operative" or "apparatus non-operative" signal. Each apparatus 10 then receives the "apparatus operative" or "apparatus non-operative" signals from its predetermined, or designated, one of the other apparatus 10. Each apparatus 10 also receives its own "apparatus operative" or "apparatus non-operative" signal that it transmitted. If one or more of the apparatuses 10 of the system 1 are in an "apparatus non-operative" state, the controller 30 of each apparatus 10 either shuts down its respective apparatus 10 or ceases to act on any movement instructions received from the central command module 4.

As mentioned above, in one particular embodiment, the system 1 is comprised of at least three apparatuses that are labelled A, . . . , n–1, n and a CCM. Again, it should be appreciated that the apparatus 10 in the system 1 may be labelled in any particular order and the labelling of each apparatus 10 should not be taken to be limiting. It should also be appreciated that the use of the letter n to denote the number of apparatuses signifies that there could be any number of apparatuses greater than two in the system 1. For this particular embodiment, the method includes the steps of: apparatus A transmitting a signal that is only received by or receivable by the receiver module of apparatus n–1; apparatus n–1 transmitting a signal that is only received by or receivable by the receiver module of apparatus n, and apparatus n transmitting a signal that is only received by or receivable by the receiver module of apparatus A. It may also be the case that apparatus A only transmits a signal to apparatus n–1; apparatus n–1 only transmits a signal to apparatus n, and apparatus n only transmits a signal to apparatus A. It should be appreciated that the method need not necessarily start with apparatus A transmitting a signal that is only received by apparatus n–1. The method could instead start with apparatus n transmitting a signal that is only received by apparatus A without departing from the scope of the present invention. All that is required is that the method includes the steps.

It has been envisaged that the system 1 will operate sequentially. By this we mean that an apparatus 10 is only capable of transmitting its operative status once it has received the operative status of its first, or second, predetermined, or designated, one of the other apparatus. In the particular embodiment of a system comprised of n apparatus, the method includes the steps of: apparatus A only transmitting its operative status once the receiver module of apparatus A has received the status of apparatus n; apparatus n–1 only transmitting its operative status once the receiver module of apparatus n–1 has received the status of apparatus A, and apparatus n only transmitting its operative status once the receiver module of apparatus n has received the status of apparatus n–1. Each apparatus 10 also receives its own "apparatus operative" or "apparatus non-operative" signal either at the same time, before, or after it receives the signal from another one of the apparatuses 10.

The method may also further include the step of the central command module receiving the operative statuses of each of the apparatus.

Because of the communication paths between the apparatus, if one or more of the apparatus 10 of said system 1 are in an "apparatus non-operative" state, the controllers 30 of the apparatuses 1 effect shut down of the apparatuses 10 to ensure that the load remains in a safe position. In the present invention, shutdown has been achieved within a very short time period—around 60 ms.

The controller 30 of the respective non-operative apparatuses 10 sends information relating to the status of its components and/or devices to the CCM 4. This assists the user in identifying what the fault is in each respective non-operative apparatus 10 to help them fix the apparatus 10, and start the system 1 running again.

The controller 30 of the respective non-operative apparatuses 10 may conduct the method steps at the same time, sending information relating to the status of its components and/or devices to the CCM 4 to enable a user to identify the fault present before shutting the apparatus 10 down or during shut down of the apparatus 10.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An apparatus for transporting a load, including:
   a body including a part or portion for engaging with or connecting to a load to be transported;
   a ground-engaging device supporting the body, the ground-engaging device for effecting movement of the body over a surface;
   a transmitter module;
   a receiver module; and
   a controller for communicating with the transmitter and receiver modules and the ground engaging device and for receiving status signals from components and/or devices of the apparatus,
   wherein the controller is capable of conducting a check as to the status of the components and/or devices of the apparatus, and after completing said check to provide an "apparatus operative" or "apparatus non-operative" signal to the transmitter module,
   wherein the transmitter module is configured to transmit the "apparatus operative" or "apparatus non-operative" signal including to its own receiver module, and
   wherein the receiver module is configured to receive from a first predetermined, or designated, other such apparatus its respective "apparatus operative" or "apparatus non-operative" signals.

2. An apparatus according to claim 1 wherein the transmitter module is configured to transmit the "apparatus operative" or "apparatus non-operative" signal to a receiver module of the first or a second other predetermined, or designated, other such apparatus.

3. An apparatus according to claim 1 wherein the controller will only cause operation of the ground-engaging device to move the apparatus if the receiver module receives "apparatus operative" signals from its transmitter module and from the transmitter module of the first or second other such apparatus.

4. An apparatus according to claim 1 wherein the apparatus includes a movement instruction receiver module capable of receiving instructions to move or stop movement of the ground-engaging device from a central command module.

5. An apparatus according to claim 4 wherein the movement instructions include one or both of direction or speed instructions of the ground-engaging device.

6. An apparatus according to claim 1 wherein the apparatus includes an electric motor for effecting translational movement of the ground-engaging device over a surface.

7. An apparatus according to claim 1 wherein the apparatus includes a further electric motor for effecting steering of the ground-engaging device.

8. An apparatus according to claim 1 wherein the ground-engaging device includes a wheel rotatable about a substantially horizontal axis.

9. An apparatus according to claim 1 wherein the controller is capable of sending and receiving signals to and/or from the transmitter and/or receiver modules.

10. An apparatus according to claim 1 wherein the check as to the status of the components and/or devices of the apparatus is continuous or periodic.

11. An apparatus according to claim 1 wherein the components and/or devices of the apparatus automatically send signals as to their status to the controller or wherein the controller requests a status from each of the components and/or devices of the apparatus.

12. An apparatus according to claim 1 wherein the transmitter module transmits the "apparatus operative" or "apparatus non-operative" signal to a receiver module of the first or second other such apparatus via a hard-wired connection.

13. An apparatus according to claim 1 wherein the transmitter module transmits the "apparatus operative" or "apparatus non-operative" signal to its own receiver module via a hard-wired connection.

14. An apparatus according to claim 1 wherein the transmitter module transmits the "apparatus operative" or "apparatus non-operative" signal to a receiver module of the first or second other such apparatus via a wireless connection.

15. An apparatus according to claim 1 wherein the transmitter module transmits the "apparatus operative" or "apparatus non-operative" signal to its own receiver module via a wireless connection.

16. A system for transporting a load including at least three apparatus (A, . . . , n–1, n) each in accordance with claim 1, and a central command module for sending movement instructions to move or stop movement of the ground-engaging device of each apparatus,
wherein the receiver module of each apparatus is configured to receive from a first predetermined, or designated, other such apparatus its respective "apparatus operative" or "apparatus non-operative" signals.

17. A system according to claim 16 wherein,
apparatus A transmits a signal which is only capable of being received by the receiver module of apparatus B; and
wherein apparatus n–1 transmits a signal which is only capable of being received by the receiver module of apparatus n; and
wherein apparatus n transmits a signal which is only capable of being received by the receiver module of apparatus A.

18. A system according to claim 16 wherein the transmitter module of each apparatus is configured to transmit an "apparatus operative" or "apparatus non-operative" signal to a receiver module of the first or a second predetermined, or designated, other such apparatus such that:
apparatus A only transmits a signal to apparatus n–1;
apparatus n–1 only transmits a signal to apparatus n; and
apparatus n only transmits a signal to apparatus A.

19. A system according to claim 16 wherein the apparatus are configured to transmit their operative status signals sequentially such that:
apparatus A only transmits its operative status once the receiver module of apparatus A has received the status of apparatus n;
apparatus n–1 only transmits its operative status once the receiver module of apparatus n–1 has received the status of apparatus A; and
apparatus n only transmits its operative status once the receiver module of apparatus n has received the status of apparatus n–1.

20. A system according to claim 16 wherein the central command module receives the operative status of each of the apparatus.

21. A method of operating a system for transporting a load including at least three apparatus (A, . . . , n–1, n), each apparatus having a controller, a transmitter module, and a receiver module, and the system including a central command module, the method including the steps of:
for each apparatus, conducting a check as to the status of the components and/or devices of the apparatus, and after completing said check providing an "apparatus operative" or "apparatus non-operative" signal to its transmitter module,
for each apparatus, transmitting its "apparatus operative" or "apparatus non-operative" signal,
for each apparatus, receiving at its receiver module "apparatus operative" or "apparatus non-operative" signals from a predetermined, or designated, one of the other apparatus,
wherein, if one or more of the apparatus of said system are in an "apparatus non-operative" state, the controller of each apparatus either shuts down its respective apparatus or ceases to act on any movement instructions received from the central command module.

22. A method according to claim 21 wherein the method further includes the steps of:
apparatus A transmitting a signal that is only received by or receivable by the receiver module of apparatus n–1;
apparatus n–1 transmitting a signal that is only received by or receivable by the receiver module of apparatus n; and
apparatus n transmitting a signal that is only received by or receivable by the receiver module of apparatus A.

23. A method according to claim 21 wherein the method further includes the steps of:
apparatus A only transmitting a signal to apparatus n–1;
apparatus n–1 only transmitting a signal to apparatus n; and
apparatus n only transmitting a signal to apparatus A.

24. A method according to claim 21 wherein the apparatus transmit their operative status signals sequentially, the method including the steps of:

apparatus A only transmitting its operative status once the receiver module of apparatus A has received the status of apparatus n;

apparatus n−1 only transmitting its operative status once the receiver module of apparatus n−1 has received the status of apparatus A; and apparatus n only transmitting its operative status once the receiver module of apparatus n has received the status of apparatus n−1.

25. A method according to claim 21 wherein the method further includes the step of for each apparatus, receiving its own "apparatus operative" or "apparatus non-operative" signals either at the same time, before, or after it receives the signal from another one of the apparatuses.

26. A method according to claim 21 the method further including the step of the central command module receiving the operative statuses of each of the apparatus.

27. A method according to claim 21 wherein the controller of the respective non-operative apparatus(es) send(s) information relating to the status of its components and/or devices to the central command module.

28. A method according to claim 21 wherein the controller of the respective non-operative apparatus(es) send(s) information relating to the status of its components and/or devices to the central command module before shut down occurs or during shut down.

\* \* \* \* \*